(12) United States Patent
Fukuchi

(10) Patent No.: US 8,941,820 B2
(45) Date of Patent: Jan. 27, 2015

(54) PARTICLE IMAGE VELOCIMETRY SYSTEM FOR THREE-DIMENSIONAL SPACE

(71) Applicant: Honda Motor Co., Ltd., Tokyo (JP)

(72) Inventor: Yuichi Fukuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 13/792,523

(22) Filed: Mar. 11, 2013

(65) Prior Publication Data

US 2013/0242286 A1 Sep. 19, 2013

(30) Foreign Application Priority Data

Mar. 16, 2012 (JP) .................. 2012-059955
Dec. 18, 2012 (JP) .................. 2012-275381

(51) Int. Cl.
*G01P 5/26* (2006.01)
*G01P 5/00* (2006.01)
*G01P 5/22* (2006.01)

(52) U.S. Cl.
CPC . *G01P 5/26* (2013.01); *G01P 5/001* (2013.01); *G01P 5/22* (2013.01)
USPC ............................ 356/28; 356/28.5

(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

2005/0030519 A1* 2/2005 Roth ........................... 356/28.5

FOREIGN PATENT DOCUMENTS

JP 2007-085784 A 4/2007
JP 2011-180028 A 9/2011

OTHER PUBLICATIONS

G.E. Elsinga et al., "Tomographic Particle Image Velocimetry", 6th International Symposium on Particle Image Velocimetry, Sep. 21-23, 2005, pp. 1-12.
Kyle Lynch et al., "Three-Dimensional Particle Image Velocimetry Using a Plenoptic Camera", 50th AIAA Aerospace Sciences Meeting including the New Horizons and Aerospace Exposition, Jan. 9-12, 2012, pp. 1-14.
German Office Action application No. 10 2013 204 375.9 dated Jul. 19, 2013.

* cited by examiner

*Primary Examiner* — Luke Ratcliffe
(74) *Attorney, Agent, or Firm* — Squire Patton Boggs (US) LLP

(57) ABSTRACT

An imaging device can take an image of a flow field including tracer particles includes a compound-eye lens formed from a large number of monocular lenses, which take images of images taken by an imaging lens. Each of the multiple monocular lenses functions as one imaging device. This can enable measurement precision to be enhanced by suppressing the influence of ghost particles, while reducing the equipment cost by minimizing the number of imaging devices. A space for installing the imaging device can easily ensured. If a large number of imaging devices are used, not only do they require time and manpower for setting up, but there is also a possibility that the measurement precision will be degraded due to displacement of an axis of the imaging devices caused by vibration, etc. When the imaging device having the compound-eye lens is used, setup is simplified, and measurement precision can be ensured.

2 Claims, 8 Drawing Sheets

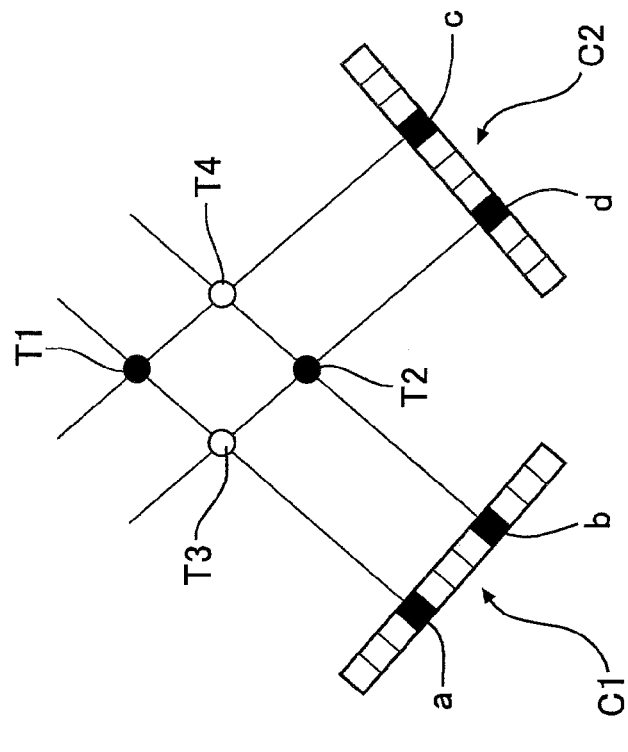
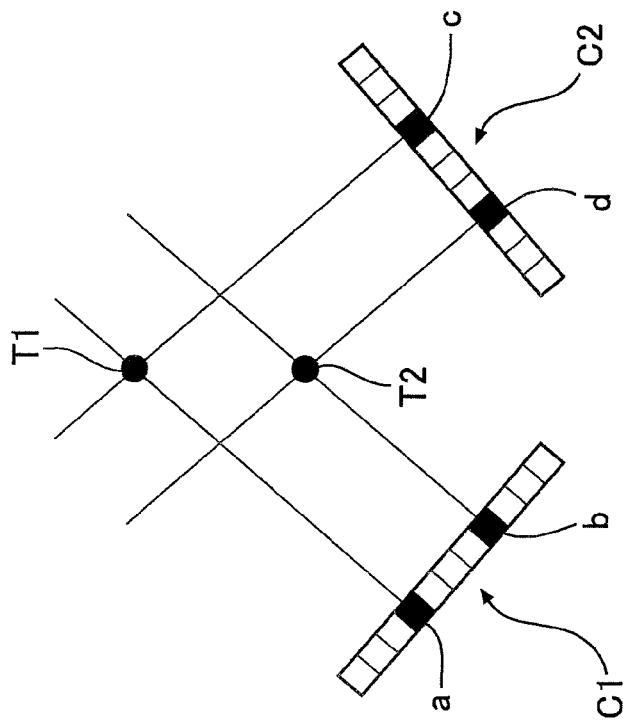

PARTICLE IMAGE VELOCIMETRY SYSTEM FOR THREE-DIMENSIONAL SPACE

BACKGROUND

1. Field

Embodiments of the present invention relate to a particle image velocimetry system for a three-dimensional space, the system involving illuminating tracer particles flowing around an object with laser light at two times separated by a very small period of time, taking images of the tracer particles illuminated with the laser light by an imaging device, and measuring the velocity field of three velocity components in the three-dimensional space by tomography from the obtained images at the two times.

2. Description of the Related Art

PIV (Particle Image Velocimetry), in which fluid including tracer particles is illuminated with sheet-shaped illumination two times with a predetermined interval therebetween, images of the tracer particles illuminated with the illumination are taken by one imaging means, and the amount of movement of the tracer particles is determined from the images at the two times to thus measure a two-dimensional distribution of the flow velocity of the fluid is known from Japanese Patent Application Laid-open No. 2007-85784 and Japanese Patent Application Laid-open No. 2011-180028.

Furthermore, tracer particles included in an unsteady flow flowing around an object are illuminated with volume illumination having a rectangular, etc. shape at two times with a very short time interval therebetween, and an image of the illuminated tracer particles is taken by imaging means in at least three directions. A three-dimensional image is reconstructed for each of the images taken at time 1 and time 2 using tomographic theory. A particle image velocimetry system employing tomographic PIV that measures the velocity field of three velocity components of a tracer particle group from a cross-correlation between the three-dimensional images at the respective times is known from Non-Patent Document 1 (6th International Symposium on Particle Image Velocimetry Pasadena, Calif., USA, Sep. 21-23, 2005, "Tomographic particle image velocimetry" G. E. Elsinga, F. Scarano, B. Wieneke, B. W. van Oudheusden).

Meanwhile, the arrangement described in Non-Patent Document 1 above has the problem that, since images of the region illuminated with volume illumination are taken from different directions by means of a plurality of cameras, when the position of tracer particles in three-dimensional space is calculated from the obtained images, a tracer particle (ghost particle) that is not actually present is recognized as if it were present.

FIGS. 7A and 7B schematically show states in which images of two tracer particles T1 and T2 are taken by two cameras C1 and C2; it is assumed that as shown in FIG. 7A the tracer particles T1 and T2 appear in pixels a and b of the camera C1, and at the same time the tracer particles T1 and T2 appear in pixels c and d of the camera C2. As shown in FIG. 7B, the position of the tracer particle obtained from information of the pixels a and c and the position of the tracer particle obtained from information of the pixels b and d correspond to those of the tracer particles T1 and T2, which are actually present, and the position of the tracer particle obtained from information of the pixels a and d and the position of the tracer particle obtained from information of the pixels b and c include, in addition to the tracer particles T1 and T2, ghost particles T3 and T4, which are not actually present. Due to the positional information of tracer particles T1 and T2, which are actually present, being contaminated with the positional information of the ghost particles T3 and T4, the measurement precision of the three-dimensional velocity field is degraded In order to exclude information regarding ghost particles and leave only information regarding tracer particles that are actually present, the number of cameras may be increased. FIG. 8 shows the relationship between the number of cameras and the ghost ratio (number of actual tracer particles/number of ghost particles); for example, in order to achieve a ghost ratio of 1, it is necessary to employ 12 cameras. However, increasing the number of cameras not only causes the equipment cost to increase greatly but also makes it difficult to ensure that there is a space for installing the cameras and, moreover, there is a problem that it requires much time and manpower for setting up the cameras.

SUMMARY

The present invention has been accomplished in light of the above-mentioned circumstances, and it is an object thereof to provide enhanced measurement precision while reducing the number of cameras when measuring a three-dimensional velocity field around an object using tomographic theory.

In order to achieve the object, according to a first embodiment of the present invention, there is provided a particle image velocimetry system for a three-dimensional space. The system involves illuminating tracer particles flowing around an object with laser light at two times separated by a very small period of time, taking images of the tracer particles illuminated with the laser light by an imaging device, and measuring the velocity field of three velocity components in the three-dimensional space by tomography from the obtained images at the two times. The imaging device comprises an imaging lens that takes an image of tracer particles, a compound-eye lens that comprises a large number of monocular lenses for taking images of the images taken by the imaging lens, and a light receiving element that subjects the image taken by the monocular lens to photoelectric conversion.

In this embodiment, tracer particles included in a flow field around the object are illuminated with laser light, and an image thereof is taken by imaging means at two times separated by a very small period of time. The position of tracer particles in the three-dimensional space is calculated by tomography from the images at the two times, the velocity field of three velocity components in the three-dimensional space can be measured from the difference between the positions of tracer particle at the two times and, moreover, the use of tomography enables an unsteady velocity field in the three-dimensional space to be measured directly without stacking velocity fields in two-dimensional space on one another.

Since the imaging device include the imaging lens, which takes an image of tracer particles, the compound-eye lens formed from the large number of monocular lenses, which take images of the image taken by the imaging lens, and the light receiving element, which subjects the image taken by the monocular lens to photoelectric conversion, each of the plurality of monocular lenses forming the compound-eye lens of one imaging device functions as one imaging device. One imaging device can be made to exhibit the same function as that of a plurality of imaging device. This not only enables the measurement precision to be enhanced by suppressing the influence of ghost particles while greatly reducing the equipment cost by minimizing the number of imaging device, but also enables a space for installing the imaging device to be easily ensured. Moreover, if a large number of imaging device are used, not only is there a problem that they require much time and manpower for setting up, but there is also a possibility that the measurement precision will be degraded due to displacement of an axis of each of the imaging device caused by vibration, etc. However, since the imaging device having the compound-eye lens is used, setting up becomes easy and, moreover, since the positional relationship between the large number of monocular lenses of the compound-eye lens does not change, the measurement precision can be ensured.

According to a second embodiment of the present invention, when a focal length of the imaging lens is fd, a distance from a focal point of the imaging lens to the compound-eye lens is d, and a distance from the imaging lens in an optical axis direction is x, a region satisfying $$fd < x < fd + (fd^2/d)$$

is an imaging region.

With such an embodiment, when the focal length of the imaging lens is fd, the distance from the focal point of the imaging lens to the compound-eye lens is d, and the distance from the imaging lens in the optical axis direction is x, a region satisfying $$fd < x < fd + (fd^2/d)$$

is defined as the imaging region, it becomes possible to take images of individual tracer particles present in the imaging region simultaneously by a large number of monocular lenses, thereby further enhancing the measurement precision.

Here, a CCD camera 14 in an embodiment corresponds to the imaging device of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 7A and 7B are diagrams for explaining the generation of ghost particles.

DETAILED DESCRIPTION

An embodiment of the present invention is explained below by reference to FIG. 1 to FIG. 6.

Figure 1:
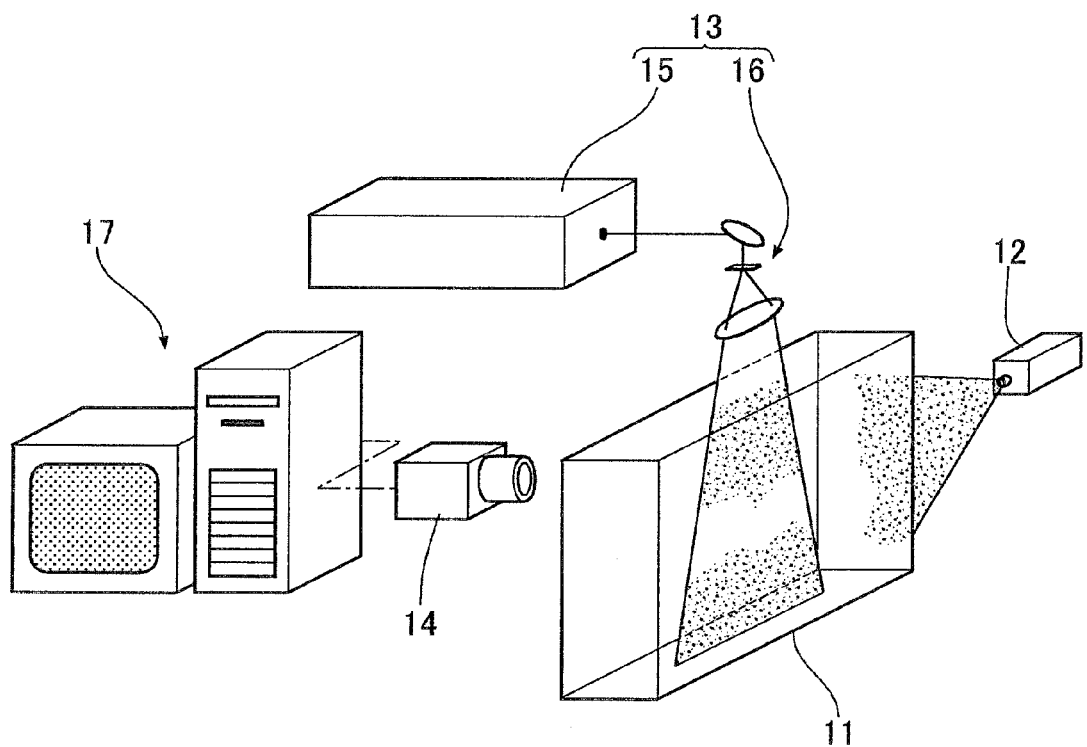
FIG. 1 is a diagram showing the overall arrangement of a particle image velocimetry system.

As shown in FIG. 1, a particle image velocimetry system of the embodiment is used for measuring a three-dimensional velocity field around an object such as an automobile vehicle body. A tracer particle supply unit 12, disposed in an upstream part of a wind tunnel 11 to which a uniform flow of air at a predetermined flow velocity is supplied, supplies microscopic oil droplets (tracer particles) having a diameter of a few μm to the interior of the wind tunnel 11. The uniform flow changes its direction along the surface of the object, thus forming a three-dimensional velocity field. In the case of a closed type wind tunnel 11, at least one part of its wall face is provided with a transparent observation window, and a light source 13 and a CCD camera 14 are disposed at positions where they face the object with the observation window disposed therebetween.

The light source 13 is formed from a laser head 15 and an optical system 16; a laser beam such as an Nd:YAG laser emitted from the laser head 15 is changed in direction by means of a mirror in the optical system 16, then passes through a concave lens, a convex lens, and a knife edge to thus become volume illumination, and illuminates a predetermined three-dimensional region within the wind tunnel 11. The CCD camera 14 takes an image of tracer particles present in the region illuminated with the volume illumination within the wind tunnel 11, and the image is analyzed by an image processor 17 formed from a workstation, etc. The laser head 15 emits laser light at predetermined time intervals, and in synchronization with the emission timing the CCD camera 14 takes images of the predetermined three-dimensional region within the wind tunnel 11 illuminated with the volume illumination.

Figure 2:
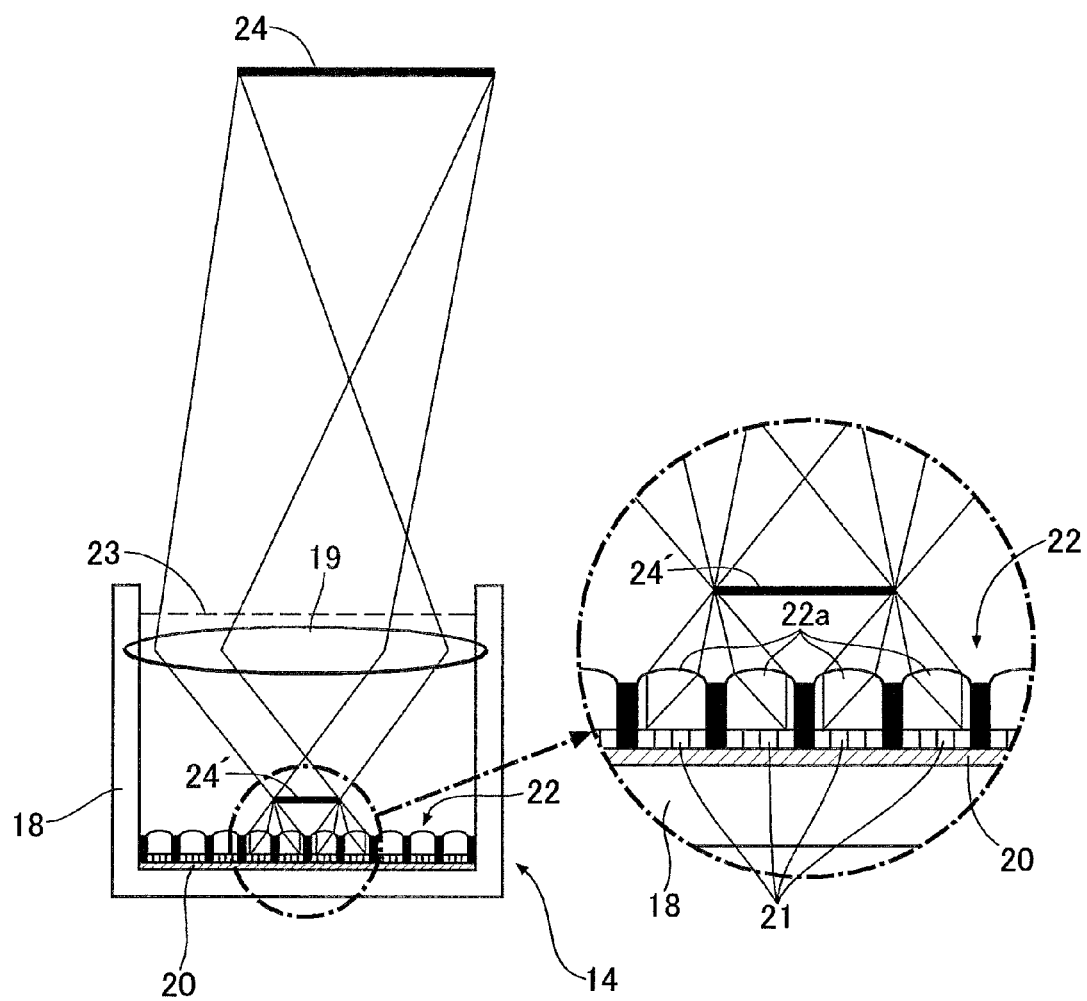
FIG. 2 is a diagram showing the structure of a compound-eye lens-equipped CCD camera.

As shown in FIG. 2, the CCD camera 14 is formed from an imaging lens 19 supported on a housing 18, light receiving elements 21 disposed on a substrate 20 placed in a bottom part of the housing 18, a compound-eye lens 22 formed from a large number of monocular lenses 22a disposed so as to cover the surface of the light receiving elements 21, and a filter 23 disposed in front of the imaging lens 19.

An object 24 such as tracer particle is formed into an image 24' within the housing 18 by the imaging lens 19, and the image 24' is formed into a plurality of images on the light receiving elements 21 by the plurality of monocular lenses 22a of the compound-eye lens 22. In this process, the object 24 such as tracer particle is captured as 9 or 16 two-dimensional images by, for example 3×3=9 monocular lenses 22a or 4×4=16 monocular lenses 22a. These two-dimensional images are images that are slightly different from each other due to the parallax corresponding to the positions of the respective monocular lenses 22a. It can therefore be said that one imaging camera 14 is a collection of a large number of monocular cameras.

Figure 3:
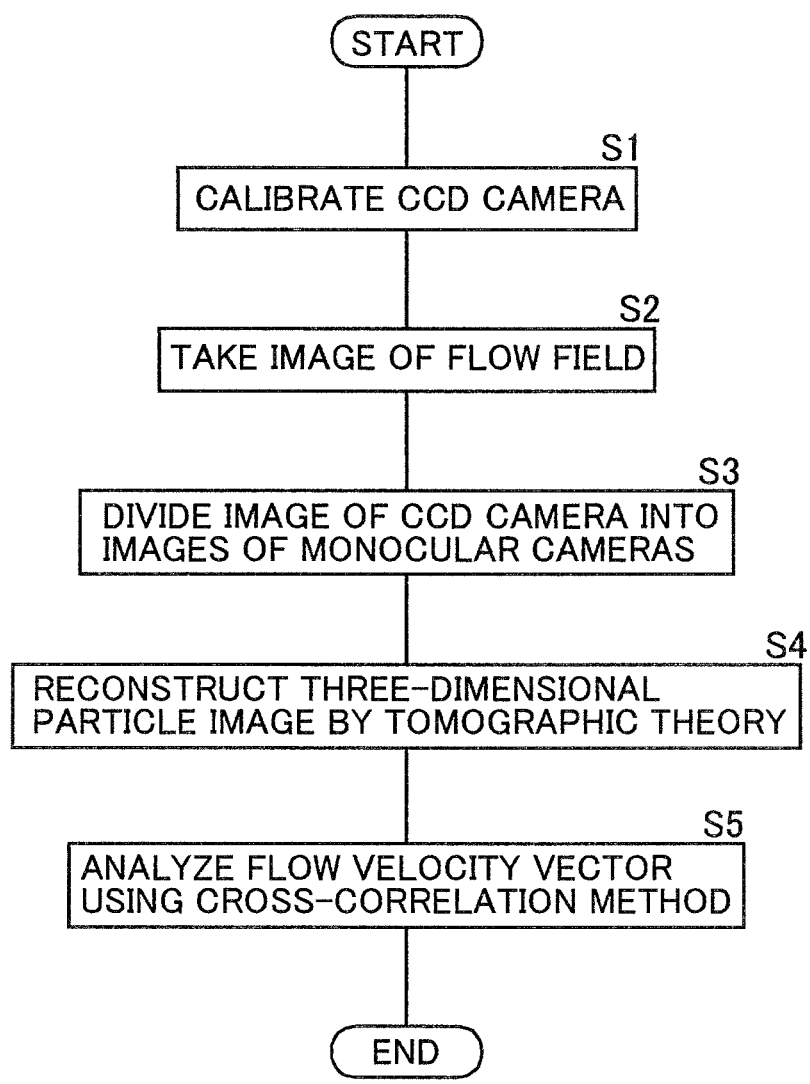
FIG. 3 is a flowchart showing the procedure of particle image velocimetry.

FIG. 3 is a flowchart showing the procedure for measurement processing of a velocity field of a three-dimensional space; first, in step S1 the relationship between a pixel in an image taken by each monocular camera of the CCD camera 14 and the corresponding position of the three-dimensional region within the wind tunnel 11 is calibrated. Specifically, a grid-shaped three-dimensional object is placed within the wind tunnel 11 and imaged by the CCD camera 14, and correspondences between pixels of images taken by each of the monocular lenses 22a and grid points of the three-dimensional object are clearly defined in advance. Since there is parallax between images taken by the monocular cameras, the position of a pixel corresponding to a predetermined grid point of the three-dimensional object varies among the images.

In the subsequent step S2, in a state in which air including tracer particles is made to flow within the wind tunnel 11, laser light is emitted twice from the light source 13 with a predetermined time interval therebetween, and in synchronism with the emission timing the CCD camera 14 takes an image of a predetermined three-dimensional region within the wind tunnel 11 illuminated with the laser light. In the subsequent step S3 each of the two images thus obtained is divided into a plurality of images corresponding to each of the monocular cameras. These divided images are images taken of the same three-dimensional region within the wind tunnel 11 but are slightly different from each other due to the parallax corresponding to the positions of the monocular cameras, and with regard to images taken even by the same monocular camera, the image taken at the first time and the image taken at the second time are different by a proportion corresponding to the movement of tracer particles in the elapsed time.

In the subsequent step S4, with regard to each of the image taken at the first time and the image taken at the second time, a three-dimensional image of the tracer particles is reconstructed in accordance with tomographic theory based on information from the divided plurality of two-dimensional images. In the present embodiment, MART (Multiple Algebraic Reconstruction Technique), which is a tomographic theory suitable for a particle image velocimetry system, is used.

Figure 4:
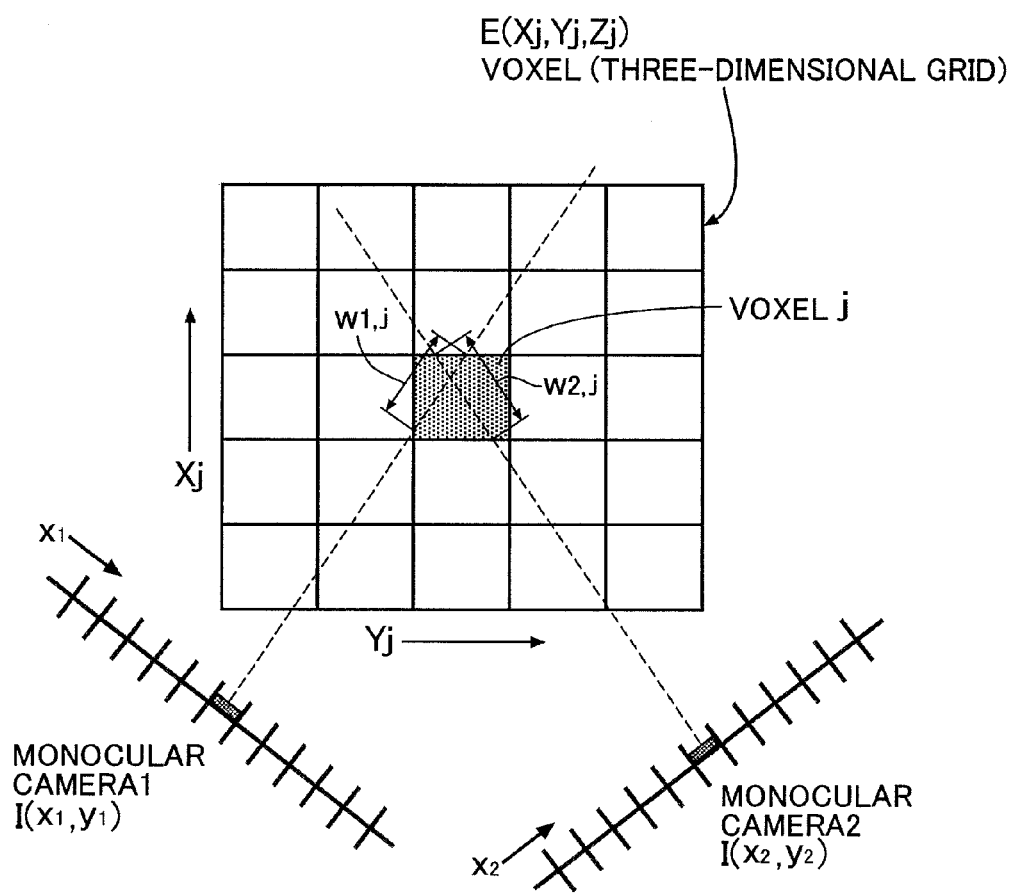
FIG. 4 is a diagram for explaining tomographic theory.

In FIG. 4, E(Xj, Yj, Zj) denotes the intensity of a voxel having three-dimensional coordinates (Xj, Yj, Zj), and j is the number of the voxel. FIG. 4 is drawn in two dimensions for convenience; a voxel is a regular grid unit in three-dimensional space, and is extended to the three-dimension from a pixel, which is a regular grid unit expressing two-dimensional image data. Therefore, the value of E(Xj, Yj, Zj) being high means that a tracer particle that reflects laser light is present in the $j^{th}$ voxel j, which has coordinates (Xj, Yj, Zj).

In FIG. 4, a tracer particle is present in the voxel j, which is shaded, and the voxel j is imaged by means of the plurality of monocular cameras. I(xi, yi) denotes the intensity of a pixel having two-dimensional coordinates (xi, yi) of a two-dimensional image taken by a monocular camera, and i is the number of the monocular camera. In practice, the number of monocular cameras is 9 or 16, but for convenience in FIG. 4 two monocular cameras (i=1 and i=2) are shown.

When a weighting function wij is defined as the length over which a normal extending from the pixel having coordinates (xi, yi) of the $i^{th}$ monocular camera intersects the $j^{th}$ voxel, the relationship between the intensity I(xi, yi) of an image taken by each monocular camera and the three-dimensional intensity distribution E(Xj, Yj, Zj) of a tracer particle is given by equation (1) below.

[Equation 1]

$$I(xi, yi) = \sum_{j \in Ni} wi, j \cdot E(Xj, Yj, Zj) \quad (1)$$

By giving predetermined initial values to the three-dimensional intensity distribution E(Xj, Yj, Zj) of equation (1) and then iteratively calculating equation (2) below, the three-dimensional intensity distribution E(Xj, Yj, Zj) is obtained.

[Equation 2]

$$E(Xj, Yj, Zj)^{k+1} = E(Xj, Yj, Zj)^k \cdot \left( \frac{I(xi, yi)}{\sum_{j \in Ni} wi, j \cdot E(Xj, Yj, Zj)} \right)^{\mu wij} \quad (2)$$

The meaning of equation (2) is that the intensity distribution E(Xj, Yj, Zj) of a target three-dimensional image is obtained by repeating operations in which, if the intensity distribution E(Xj, Yj, Zj) of the reconstructed three-dimensional image is stronger than the intensity I(xi, yi) of the two-dimensional image of the monocular camera, it is attenuated in the following step, and if it is weaker it is emphasized in the following step.

In this way, when a three-dimensional image of tracer particles is reconstructed in accordance with tomographic theory using information from the plurality of two-dimensional images of the monocular cameras, in step S5 of the flowchart of FIG. 3 a three-dimensional velocity vector of a tracer particle is calculated by comparing two three-dimensional images with a time difference using a cross-correlation method. That is, the correspondence relationship of voxels having high intensity in the two three-dimensional images is determined, and a flow velocity vector of a tracer particle can be calculated as a vector joining two corresponding voxels.

As described above, in a particle image velocimetry system employing stereo PIV, it is necessary to measure a velocity field of three velocity components in a three-dimensional space by stacking velocity fields within a two-dimensional plane on one another, but in accordance with the present embodiment, since a three-dimensional velocity field is measured by applying tomography to data of two-dimensional images taken by means of the CCD camera 14, the velocity field of a three-dimensional space can be measured directly without stacking velocity fields in two-dimensional space.

Furthermore, since the CCD camera 14 includes the imaging lens 19, which takes an image of tracer particles, the compound-eye lens 22 formed from the large number of monocular lenses 22a, which take images of the image taken by the imaging lens 19, and the light receiving elements 21, which subject the images taken by the monocular lenses 22a to photoelectric conversion, each of the monocular lenses 22a functions as one imaging means, and one CCD camera 14 can be made to exhibit the same function as that of a plurality of imaging means.

This not only enables the measurement precision to be enhanced by suppressing the influence of ghost particles while greatly reducing the equipment cost by minimizing the number of CCD cameras 14, but also enables a space for installing the CCD camera 14 to be easily ensured. Moreover, if a large number of CCD cameras 14 are used, not only is there the problem that they require much time and manpower for setting up, but there is also a possibility that the measurement precision will be degraded due to displacement of an axis of each of the CCD cameras 14 caused by vibration, etc., but since the CCD camera 14 having the compound-eye lens 22 is used, setting up becomes easy and, moreover, since the positional relationship between the large number of monocular lenses 22a of the compound-eye lens 22 does not change, the measurement precision can be ensured.

An imaging region suitable for measurement of a three-dimensional velocity field using the particle image velocimetry system of the present embodiment is now discussed.

Figure 5:
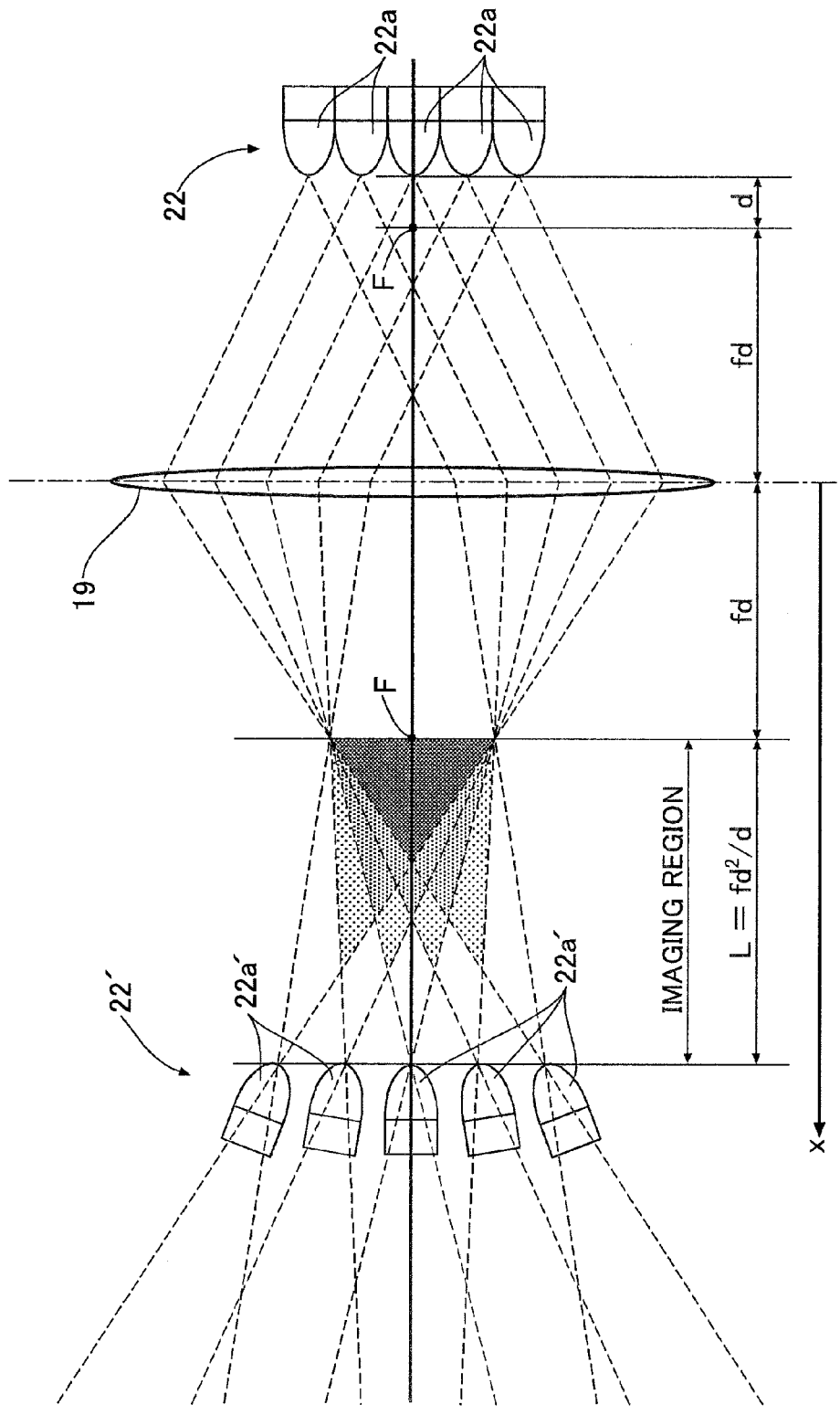
FIG. 5 is a diagram for explaining an appropriate imaging region.

As shown in FIG. 5, the compound-eye lens 22 on a right side of the imaging lens 19 forms, as a virtual compound-eye lens 22', an image on a left side of the imaging lens 19. The image of a tracer particle taken by the compound-eye lens 22 is equivalent to an image of a tracer particle taken by the virtual compound-eye lens 22'. When the focal length of the imaging lens 19 is fd, the distance from a focal point F of the imaging lens 19 to the compound-eye lens 22 is d, the distance from the focal point F of the imaging lens 19 to the virtual compound-eye lens 22' is L, and the lens formula is applied to the imaging lens 19, $$1/(L+fd)+1/(d+fd)=1/fd \quad (3)$$

is satisfied, and from equation (3), $$L=fd^2/d \quad (4)$$

is obtained.

When the imaging region is defined by $$fd < x < fd + (fd^2/d) \qquad (5)$$

since as is clear from FIG. 5 the optical axes of the plurality of virtual monocular lenses 22a' of the virtual compound-eye lens 22' converge so as to approach each other, images of tracer particles included in the imaging region defined by equation (5) are taken by the plurality of virtual monocular lenses 22a' at the same time, and measurement precision can be further enhanced by suppressing the influence of ghost particles.

Figure 6:
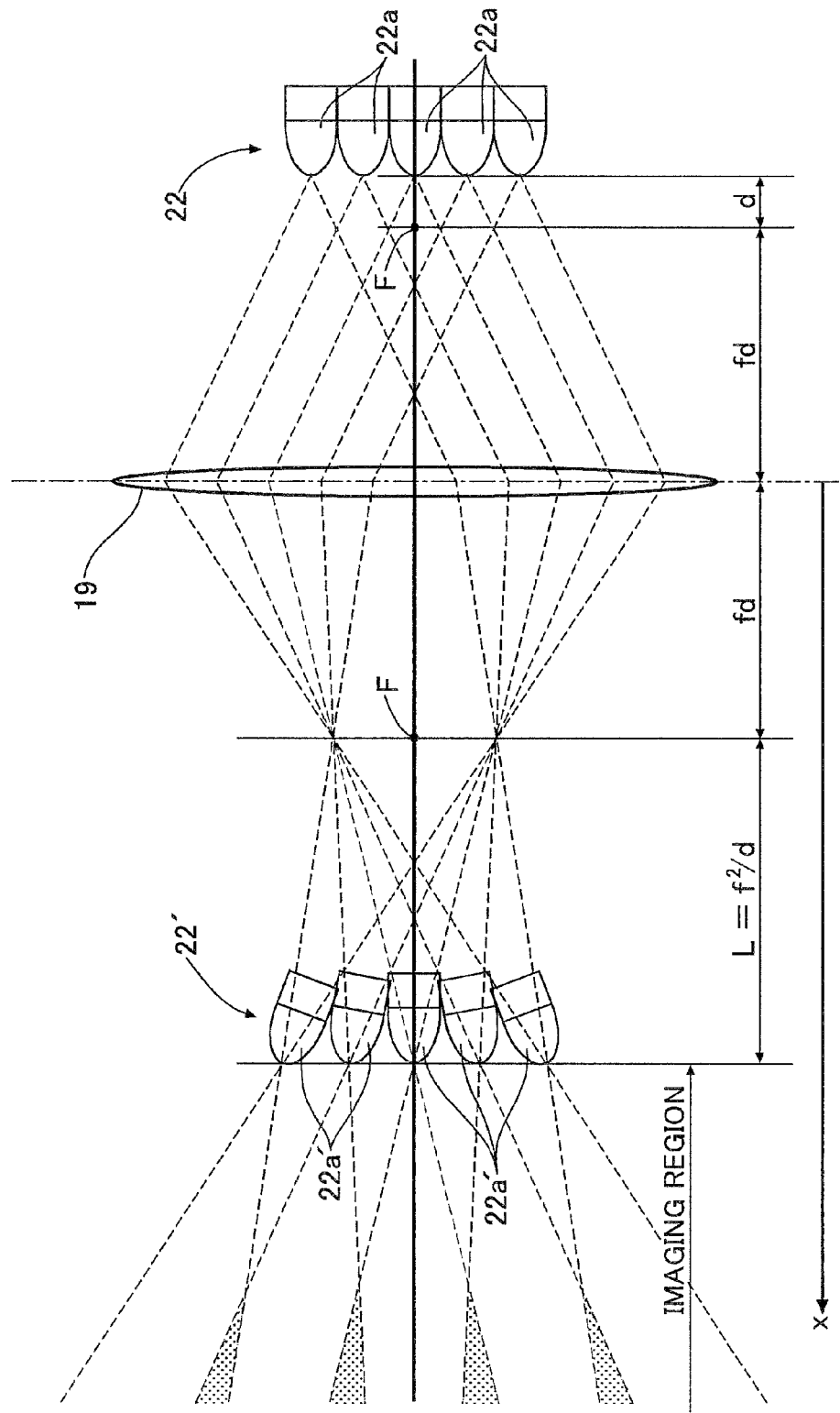
FIG. 6 is a diagram for explaining an inappropriate imaging region.
Figure 8:
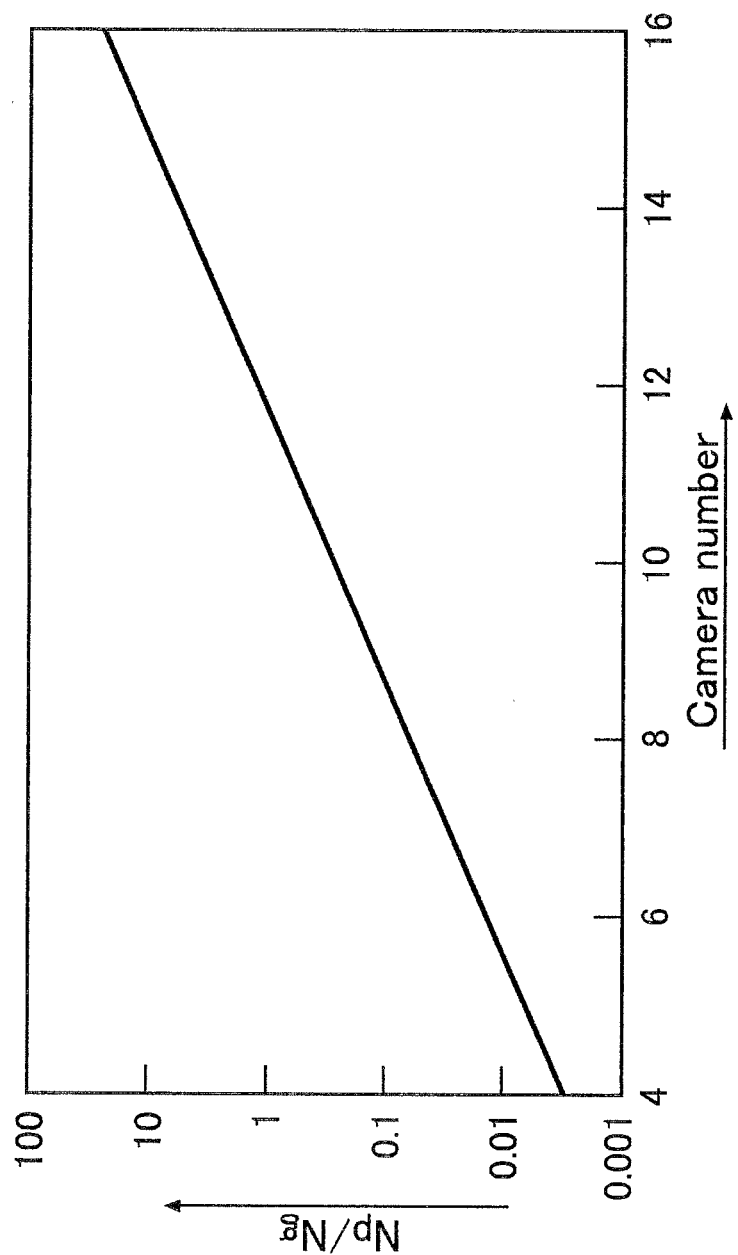
FIG. 8 is a graph showing the relationship between number of cameras and ghost ratio.

As shown in FIG. 6, if the imaging region is defined by $$x \geq fd + (fd^2/d) \qquad (6),$$

since the optical axes of the plurality of virtual monocular lenses 22a' of the virtual compound-eye lens 22' spread so as to move away from each other, images of tracer particles included in the imaging region defined by equation (6) are taken by one or a very small number of virtual monocular lenses 22a', and the measurement precision cannot be enhanced.

An embodiment of the present invention is explained above, but the present invention may be modified in a variety of ways as long as the modifications do not depart from the gist thereof.

For example, the imaging means is not limited to the CCD camera of the embodiment and may be a CMOS camera.

What is claimed is:

1. A particle image velocimetry system for a three-dimensional space, said system comprising:
    an imaging device configured to illuminate tracer particles flowing around an object with laser light at two times, said two times separated by a period of time, and to take images of the tracer particles, said imaging device comprising
        an imaging lens configured to take an image of tracer particles,
        a compound-eye lens comprising a plurality of monocular lenses for taking images of the images taken by the imaging lens, and
        a light receiving element configured to subject the image taken by the monocular lens to photoelectric conversion,
    wherein the system measures a velocity field of three velocity components in the three-dimensional space by tomography from the obtained images at the two times, and
    wherein when a focal length of the imaging lens is fd, a distance from a focal point of the imaging lens to the compound-eye lens is d, and a distance from the imaging lens in an optical axis direction is x, a region satisfying $$fd < x < fd + (fd^2/d)$$

is an imaging region.

2. A particle image velocimetry system for a three-dimensional space, said system comprising:
    imaging means for illuminating tracer particles flowing around an object with laser light at two times having a period of time therebetween and for taking images of the tracer particles, said imaging means comprising an imaging lens for taking an image of the tracer particles, a compound-eye lens comprising a large number of monocular lenses for taking images of the images taken by the imaging lens, and a light receiving element for subjecting the image taken by the monocular lens to photoelectric conversion,
    wherein the system measures a velocity field of three velocity components in the three-dimensional space by tomography from the obtained images at the two times, and
    wherein when a focal length of the imaging lens is fd, a distance from a focal point of the imaging lens to the compound-eye lens is d, and a distance from the imaging lens in an optical axis direction is x, a region satisfying $$fd < x < fd + (fd^2/d)$$

is an imaging region.

* * * * *